United States Patent
Macy et al.

(10) Patent No.: US 10,026,298 B2
(45) Date of Patent: Jul. 17, 2018

(54) SYSTEM AND METHOD FOR PROVIDING SUBSCRIBERS A SECURE ELECTRONIC EMERGENCY RESPONSE PORTAL ON A NETWORK

(71) Applicant: 9069569 Canada Inc., Kars (CA)

(72) Inventors: Mark Irwin Macy, Ottawa (CA); Brian John Roberts, Kars (CA)

(73) Assignee: 9069569 Canada Inc., Ottawa (CA)

( * ) Notice: Subject to any disclaimer, the term of this patent is extended or adjusted under 35 U.S.C. 154(b) by 0 days.

(21) Appl. No.: 15/165,383

(22) Filed: May 26, 2016

(65) Prior Publication Data
US 2016/0275780 A1    Sep. 22, 2016

Related U.S. Application Data

(63) Continuation of application No. PCT/CA2014/051053, filed on Nov. 3, 2014.
(Continued)

(51) Int. Cl.
*G08B 9/00* (2006.01)
*G08B 25/00* (2006.01)
(Continued)

(52) U.S. Cl.
CPC ......... *G08B 25/006* (2013.01); *G06Q 50/265* (2013.01); *H04L 12/1845* (2013.01); *H04L 12/1895* (2013.01); *H04L 67/10* (2013.01)

(58) Field of Classification Search
CPC ...... G01C 15/00; G06Q 10/06; G06Q 10/063; G06Q 10/06311; G06Q 10/06393;
(Continued)

(56) References Cited

U.S. PATENT DOCUMENTS

2005/0245232 A1\* 11/2005 Jakober ............... G08B 27/005
                                                                   455/410
2006/0230270 A1\* 10/2006 Goffin .................... G08B 25/10
                                                                   713/173
(Continued)

OTHER PUBLICATIONS

Canadian Intellectual Property Office, International Search Report & Written Opinion issued in corresponding Application No. PCT/CA2014/051053, dated Jan. 15, 2015, 16 pp.

*Primary Examiner* — Daniel Previl
(74) *Attorney, Agent, or Firm* — Taft Stettinius & Hollister LLP

(57) ABSTRACT

The present invention provides a system and method for providing subscribers an electronic emergency response portal on a network. In accordance with an aspect of the present invention, there is provided a method for providing subscribers an electronic emergency response portal on a network having the following steps: receiving real property information from a subscriber module; storing the real property information in a database; creating a secure portal for the subscriber module over a network, the secure portal providing an interface to one or more emergency response parties, wherein the one or more emergency response parties are given access to the interface if a permission setting to the interface is granted by the subscriber module; and providing real property information to the subscriber module and the one or more emergency response parties based on the permission setting.

20 Claims, 3 Drawing Sheets

Related U.S. Application Data

(60) Provisional application No. 61/909,046, filed on Nov. 26, 2013.

(51) Int. Cl.
   *H04L 12/18*     (2006.01)
   *G06Q 50/26*     (2012.01)
   *H04L 29/08*     (2006.01)

(58) Field of Classification Search
   CPC ....... G06Q 10/06395; G06Q 10/06398; G06Q 10/1097; G06Q 50/10; G06Q 50/165; G06Q 20/04; H04L 67/24; G07F 17/32; G07F 17/3244
   USPC .... 340/286.02, 286.05, 286.07–286.11, 287, 340/289, 290–291, 309.16, 331, 815.49, 340/572.9, 542
   See application file for complete search history.

(56) References Cited

U.S. PATENT DOCUMENTS

| | | | | |
|---|---|---|---|---|
| 2007/0050511 | A1* | 3/2007 | Dias | G06F 21/6245 709/229 |
| 2008/0103787 | A1* | 5/2008 | Cavanaugh | G06F 17/3087 705/347 |
| 2009/0209350 | A1* | 8/2009 | Kelly | G06Q 20/04 463/42 |
| 2010/0228588 | A1* | 9/2010 | Nielsen | G06Q 10/06 705/7.11 |
| 2011/0255670 | A1 | 10/2011 | Seidberg et al. | |
| 2013/0203039 | A1* | 8/2013 | Piett | G09B 7/00 434/362 |

* cited by examiner

SYSTEM AND METHOD FOR PROVIDING SUBSCRIBERS A SECURE ELECTRONIC EMERGENCY RESPONSE PORTAL ON A NETWORK

FIELD OF THE INVENTION

The present invention pertains to the field of electronic information aggregation and in particular to an emergency response application.

BACKGROUND

When a real property is involved in some type of emergency such as a fire, information made readily available is required in order increase the efficiency of disaster control to mitigate the damage caused. Currently the information related to real property is not readily available in a centralized location such that the real property personnel or any other trusted party may access these resources at the time of an emergency in order to utilize these resources to provide relevant information on demand to enhance safety of relief personnel and mitigate damage caused by the disaster.

Currently, centralization of resources may take place in an ad-hoc fashion whereby a specific event may be selected for an operation, for example a G20 meeting in a major city. During this type of event, law enforcement gathers the relevant perimeter, and resources for real property within this perimeter, such that they can better deal with potential emergencies if they occur. The drawback to this approach is that the real property managers do not have access to this information as it becomes part of the law enforcement database and there is no easy way to share the information beyond the internal system by law enforcement unbeknownst to the real property manager.

There are several independent surveillance type technologies that are prevalent which allow for an external management of micro-sensory mechanisms such as surveillance cameras which can be controlled externally, however this does not integrate into a larger network allowing for integration between the real property personnel and trusted personnel with the correct privacy and permissions in place to ensure that all information is being used for its intended purpose only.

Therefore there is a need for a secure emergency response portal which provides for ease of access to any type of real property information and harmonious integration of trusted personnel based on access controls which are specifically designed to ensure maximum real property manager privacy but not impeding the spread of relevant information to increase efficiency in dealing with emergency damage mitigation.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a system and method for providing subscribers a secure electronic emergency response portal on a network. In accordance with an aspect of the present invention, there is provided a method for providing subscribers an electronic emergency response portal on a network having the following steps: receiving real property information from a subscriber module; storing the real property information in a database; creating a secure portal for the subscriber module over a network, the secure portal providing an interface to one or more emergency response parties, wherein the one or more emergency response parties are given access to the interface if a permission setting to the interface is granted by the subscriber module; and providing real property information to the subscriber module and the one or more emergency response parties based on the permission setting.

In accordance with another aspect of the present invention, there is provided a system for providing subscribers an electronic emergency response portal on a network having: a server configured to receive real property information from a subscriber module, wherein the server is further configured to create a secure portal for the subscriber module; a database configured to store the real property information; a processing engine configured to grant access to the secure portal by one or more emergency response parties if access is allowable by a permission setting of the subscriber module set by the subscriber module; and an interface to a communication means allowing for communication between the server, the database, the subscriber module, and the processing engine.

DETAILED DESCRIPTION OF THE INVENTION

Definitions

Figure 1:
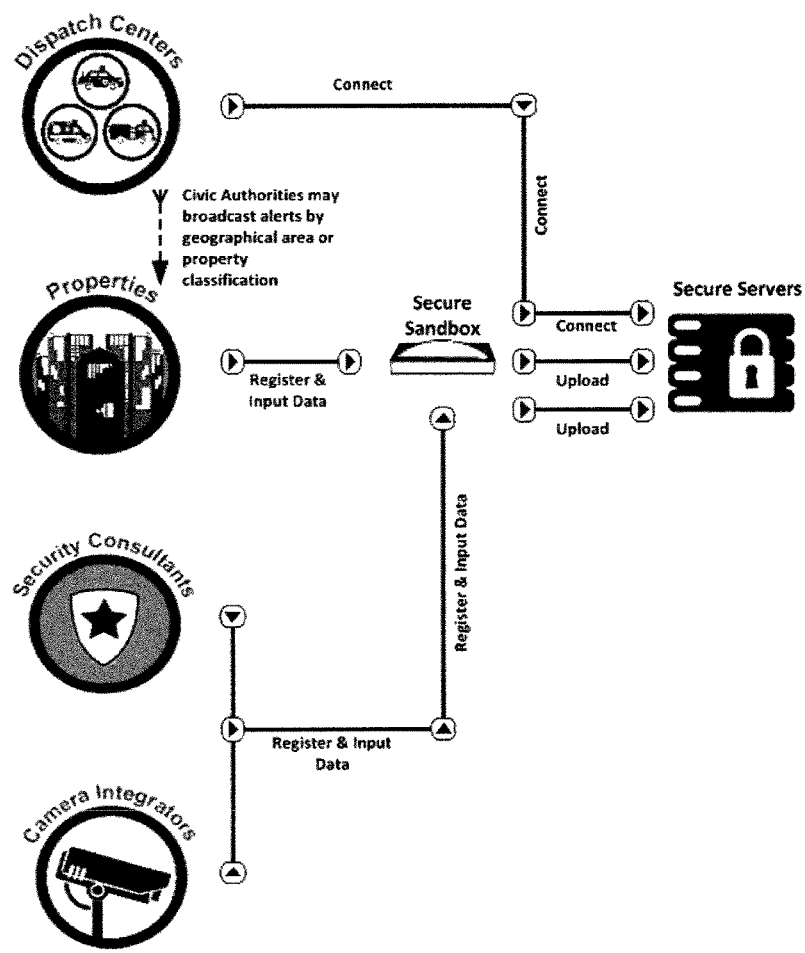
FIG. 1 illustrates an example of the secure portal interactions.

The term "ERP" refers to the emergency response portal.

The term "real property information" is used to define any information which may be related to real property/facility/occupant. Property information may be related to current status within real property such as temperature, lock status (e.g., locked, unlocked, and the like), detection of metric (e.g., motion, movement, infrared, UV, sound, radio, and the like), video surveillance (e.g., CCTV, IP cameras, film cameras, night vision cameras, IR cameras, and the like), blueprint of real property, fire plan for real property/facility, building code/facility, materials used for real property/facility, construction plans and builder materials, occupant information (e.g., hazardous material, firearm status, medical conditions, allergies, disabilities, previous health history, government issued certificates for medicines, occupant emergency contact information, pet information, and the like), information for building management personnel (e.g., contact information of guard at front desk, security company contact information, direct line for guard at desk, regular/business/quiet hour contact information), elevator phone number, location of elevators, panic intercom station phone number, video security (both primary and secondary locations), day care locations, medical clinic locations, detention holding area locations, utility shut-off locations (e.g., mechanical shut-off valve, water shut-off, fuse-boxes, electrical room, air intake controls, sprinkler controls, gas controls), main telephone room location, primary and secondary response locations and entry points for civic authorities.

The term "subscriber module" is used to define any party which has their property information saved to the secure portal (i.e., ERP). The party may be any real property owner and/or staff, management company and/or staff, occupant and/or staff, police, emergency medical services, fire-department, private security companies, commissionaires, third party service providers and/or staff hired by real property owners/managers/occupants.

The term "emergency response party" refers to any party which may be given permission to the subscriber module's property information based on a permission setting set by the subscriber module. Emergency response parties may include, but are not limited to, police, emergency medical services, fire-department, private security companies, commissionaires, homeland security, government officials, civic authorities, landlords, property representatives, building staff, third party staff hired for real property owners/managers/occupants.

The term "electronic device" may be defined as any apparatus capable of network access. The device may be wired or wireless. In some embodiments, the device may include a personal computer, tablet, mobile device, mobile phone, personal organizer, or any similar electronic network enabled device. In some embodiments, the device may be wearable technology including, but not limited to, jewelry, watches, glasses, hats, clothing, shoes, socks—essentially anything that is placed on or in a person which includes network enablement.

Unless defined otherwise, all technical and scientific terms used herein have the same meaning as commonly understood by one of ordinary skill in the art to which this invention belongs.

Secure Portal Overview

The present invention provides for a system and method for providing subscribers a secure electronic emergency response portal on a network. The portal allows for any subscriber module, for example an office building owner, an electronic location to store any and all real property information in a secure manner such that in the event of an emergency, the owner is not reliant upon conventional storage means (including information stored inside the office building itself) for vital real property information when it is most needed. Moreover, the portal allows for third parties, known as emergency response parties, to access this secure information if these one or more third parties receive permission to access the information from the office building owner. An example of the secure portal configuration can be seen in FIG. 1.

In a particular embodiment, the portal provides for a prompt to be sent to the subscriber module, for example the office building owner, to ensure that all information stored on the portal is current and therefore more likely to be trustworthy and relevant. A status flag indicating the relevancy of the information stored is also implemented to allow for the subscriber modules and the emergency response parties to beware of the last update of relevant new property information.

In at least one embodiment, the secure portal may be implemented by means of a software application. The above mentioned parties (e.g., subscriber modules, third party modules) interact with secure portal hardware/software modules to fully execute the secure portal.

The secure portal may be implemented by any means known in the art including local installation of a software application on a mobile device with minimal retrieval of extraneous data from server. In at least one embodiment, the software application is a "thin client" on the subscriber module and retrieves substantial amounts of information from server. In at least one embodiment, the software application is accessed through a network client (e.g., web browser, third party aggregator application). In at least one embodiment, the implementation of the application may include a hybrid of conventional paradigms such as those described above.

Secure Portal Modules

Figure 2:
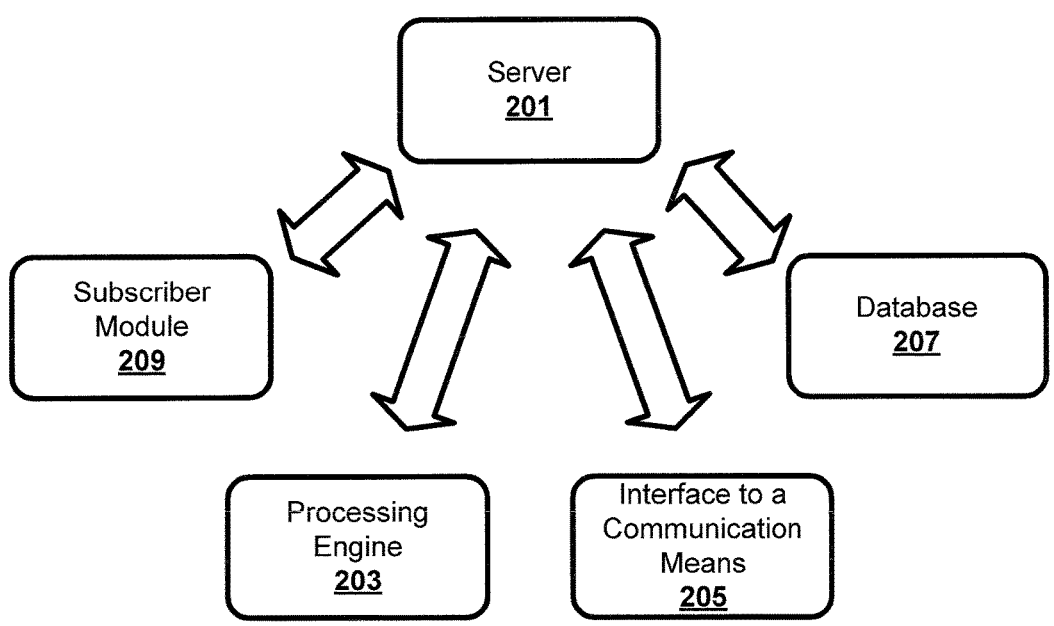
FIG. 2 illustrates an example of the system modules of the secure portal.

The secure portal requires a number of different secure portal modules which are configured to carry out discrete operations to accomplish the functions of the electronic emergency response portal. FIG. 2 is an example of a typical secure portal configuration with a server (201), a processing engine (203), an interface to a communication means (205), a database (207), and subscriber module (209).

A server is implemented which functions to receive real property information from the one or more subscriber modules. Upon receipt of the real property information from the subscriber modules, this information is sent to a database for storage for the specific subscriber module. The server also provides for authentication and verification of subscriber modules such that they securely access the portal. The server may be any hardware readily understood in the art which functions to receive the input information from the one or more subscriber modules on the secure portal.

A database is implemented for the secure portal which functions to store the real property information from the one or more subscriber modules sent from the server. The database may be of any hardware known in the art which allows for the storage, retrieval, classification, and lookup of information on the secure portal. The hardware may be local hardware or network based hardware (e.g., "cloud-based"). In at least one embodiment, the database may be a discrete piece of hardware. In at least one embodiment, the database may be the same hardware as the server/processing engine performing discrete operations. The database interacts with any other hardware and or software modules of the system which provides requisition for data stored, storage, retrieval, classification, and lookup of information.

A processing engine is implemented for the secure portal which computes various operations related to the real property information. Moreover, the processing engine computes the access and permissions set by the subscriber modules for the emergency response parties. The processing engine computes any information required for specific operations by the secure portal. Information may be retrieved from the server, database, and/or the processing engine. The processing engine may be of any hardware known in the art which allows for the computation of data in an expedient fashion. The processing engine may be of any hardware understood by a person skilled in the art. The processing engine may be implemented by, but is not limited to, any processing unit capable of calculating rules based on a logic-set which may include both hardware and software components. The hardware may be local hardware or network based hardware (e.g., "cloud-based"). In at least one embodiment, the processing engine may be a discrete piece of hardware. In at least one embodiment, the processing engine may be the same hardware as the server/database performing discrete operations.

An interface to a communication means is implemented for the secure portal such that any and all modules may communicate electronically with each other. For example, the real property information stored in the database, processing engine, server, and subscriber modules may communicate with each other via a network (e.g., wide area network). Each component interfaces this means to accomplish communication. Communication means would be understood by a person skilled in the art to include any necessary elements of hardware, including but not limited to communications ports, wireless transmitter/receivers, wires or fiber optics; and software, including but not limited to telephony, facsimile, Bluetooth®, NFC, TCP/IP, FTP, XML, and IRC, that allow electronic devices to exchange data packets.

Secure Portal Functionalities

Figure 3:
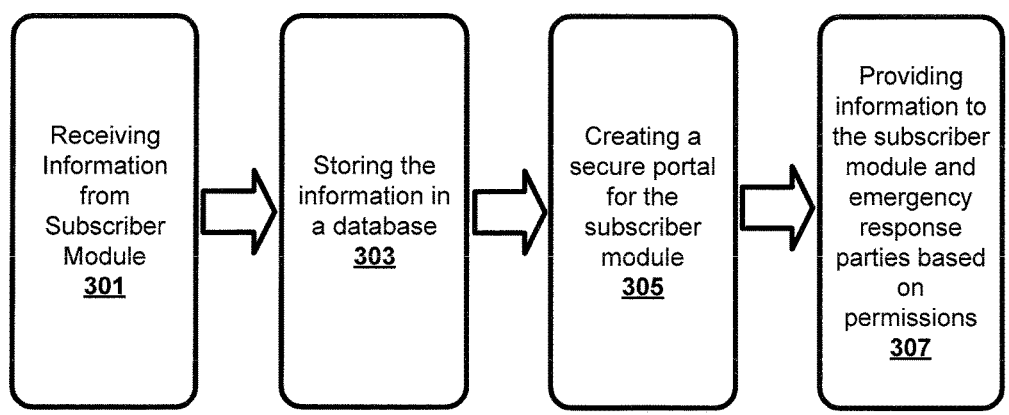
FIG. 3 illustrates an example of the procedures of creating a secure portal on the network for a subscriber module.

The secure portal may function in a variety of configurations to accomplish various different features of the system. A particular embodiment of the general procedure of storing real property information on the secure portal by a subscriber module can be seen in FIG. 3. Initially the subscriber module will select any variety of real property information and upload the information to be received by the server (301). The server receives the information and sends the received information to the database (303) for storage of the real property information assigned to the specific subscriber module. A secure portal providing an interface to the subscriber module and/or one or more emergency response parties is created by the server/processing engine (305) allowing access to the real property information. The information, provided by the server (307), is available to the subscriber module on demand. Moreover, this information is only available to the emergency response parties if the permissions allow access to these parties, which is specified by the subscriber module.

In at least one embodiment, once the real property information is shared with the one or more emergency response parties, a notification is sent to the subscriber module. In at least one embodiment, the subscriber module is notified immediately via SMS, MMS, IM, Email, Phone, VOIP, and the like. In at least one embodiment, if the subscriber module is a property manager, the property manager may configure the system such that the real property information is relayed to the tenants and occupants of the real property. In at least one embodiment, the property manager can send a self-generated message to the tenants and occupants. In this way, the message need not be generated by civic authorities or emergency personnel. For example, the property manager may want to notify tenants and occupants that the main water pipe has burst in the building due to some emergency.

The subscriber modules are authenticated with the server to process a secure portal interface prior to the information being uploaded to the secure portal. To provide security of the portal, a number of implementations may be used. In at least one embodiment, the subscriber modules, for example an office building owner, represented by their agents, or directly by themselves, register on the secure portal. The portal utilizes "enhanced SSL certificates" cryptographic protocols to ensure communication security. Any other type of prevalent security protocol may be implemented which ensures secure transfer. At the server stage, the information is subjected to a pre-set configuration of firewalls and malware guards to ensure information corning into the portal is properly vetted to mitigate any potential malicious activity. Further levels of vetting are implemented in some configurations prior to the information being available on the secure portal. The information is kept in an intermediate zone away from the secure information during the vetting stage to ensure no potential contamination occurs.

In at least one embodiment, the real property information provided by the one or more subscriber modules is vetted for formality requirements. The information is checked against a set of pre-defined requirements to ensure all meta-data is properly detailed with respect to labeling, source information, date of relevance for information, and the like. If the type of real property information is a non-conventional data type such as a live camera feed, the verification of proper functionality of the camera feed with respect to clarity, obstruction, resolution, reliability is conducted. Other types of real property information have analogous checks to ensure quality control and reliability of the information.

The one or more emergency response parties use conventional means to trigger a response on their infrastructure. For example, if a fire occurs, and the emergency response party includes the fire station, then the fire station is alerted of the fire by conventional means; generally 911 dispatch. Upon the dispatch coming to the fire station, the integration with the secure portal can occur in a number of ways. In at least one embodiment, a person in charge of logistics at the emergency response party collective (e.g., the dispatch controller of fire station) will have a fire station account with the secure portal. The dispatch controller will check their "dashboard" on the secure portal to see if there is a subscriber who has approved access to the fire station based on the subscriber's permission setting; if so, the dispatch controller can access the relevant information and push it to the fire squad sent to the location to deal with the emergency. The fire squad on scene may receive forwarded real property information via their electronic device (e.g., tablet) to view live cameras, up to date floor plans, entries to building, information regarding specific personnel and medical conditions, and the like.

In at least one embodiment, a designated "ERP controller" is given special privileges to control the flow and forward information to a sub-group of the emergency response party personnel. The ERP controller is a member of the emergency response party. The sub-group may be the personnel of the emergency response party on scene; therefore the ERP controller may wish to forward information just to this particular sub-group. For example, the ERP controller may be the fire captain, and their squad would be configured to be the sub-group.

Subscriber Module Functionalities

The subscriber modules determine which parties are allowed access to the real property information based on a permissions selection from the initial authentication set-up stage done when a subscriber account is made. The user can login to the secure portal from any electronic device. For example, the subscriber module (e.g., a house owner) may configure, set-up, and register for a secure portal account using their home PC and subsequently access the portal via a mobile means (e.g., a mobile application designed for Apple iPhone®).

In at least one embodiment, the secure portal prompts the subscriber module's account to update the relevancy of the real property information at a defined interval. For example, if the real property information has not been updated in 12 months, the portal will send a notification to the subscriber prompting for a provision of newly updated information. In at least one embodiment, the checks for relevancy can be done passively without subscriber module participation. For example, this would include verifying the correct IP address of IP camera feeds. Depending on the type of real property information, various degrees of notification will be used. The notifications are sent through the secure portal such that the subscriber module is notified immediately. For example, if the subscriber module (e.g., an occupant) has a mobile device paired to the secure portal, the module will receive a notification, including, but not limited to, SMS, MMS, IM, Email, Phone, VOIP, and the like to notify the subscriber about the requisition to provide updated information.

Corresponding to the prompting for updated real property information outlined above, a status flag is kept on account which displays the relevancy of the information based on the last check. In at least one embodiment, the implementation of this status check may include a color coded system whereby a green flag denotes that a status check has been done and information has been fully verified within a defined interval (e.g., within 6 months), a yellow flag means that the last prompt has not been answered and the interim time is now within 12 months to 24 months, a red flag may indicate that certain information has not been checked for greater than 2 interval cycles (greater than two years). In at least one embodiment, the implementation of the status flag may be with respect to each piece of discrete real property information. In at least one embodiment, the implementation of the status flag may be with respect to the overall real property information combined. In at least one embodiment, the implementation of the status flag may be a hybrid of the two techniques mentioned previously. In at least one embodiment, the real property information is kept on the subscriber module's electronic device. In this way, the subscriber module will have updated information every time the secure portal exchanges data with the subscriber module's electronic device. Therefore, even without network access, the electronic device will have the last updated real property information.

The subscriber modules interface the secure portal in a number of fashions. In at least one embodiment, the subscriber modules interface the secure portal via a dashboard like interface which can be accessed using any electronic device. The dashboard provides any number of subscriber related information including, but not limited to, access to the subscriber's real property information, current status information, flags for information relevance or any recent requisitions for information, a history of access by emergency response parties, an alert center, and the like. In at least one embodiment, the dashboard is developed such that it is platform agnostic works in equivalent fashion on tablet, PC, smartphone, Android®, iOS®, Blackberry®, and the like). In at least one embodiment, the dashboard provides for an instant messaging interface for the subscriber module. There may be multiple property owners for a single subscriber module and the instant messaging interface provides for a secure channel to send messages between multiple property owners. The instant messaging interface may be implemented using any variety of instant messaging known in the art. In at least one embodiment, the instant messaging session will last per the duration of a specific triggered event. Therefore, an instant messaging thread "per-emergency" may be implemented.

In at least one embodiment, the secure portal functions such that all information is replicated on the servers/databases such that all information accessed by the subscriber modules and/or any emergency response parties is done through the secure portal's hardware rather than the subscriber infrastructure. In this way, the bandwidth of the information flow is dependent on the infrastructure of the portal provider, rather than the subscriber module. In at least one embodiment, high bandwidth is allocated for the secure portal in anticipation of many parties accessing information at once. Therefore, the quality of service of the data travel remains at a high level with abundance of available throughput on portal side infrastructure.

Secure Portal Alerts

In at least one embodiment, the secure portal provides for an alert to all subscriber modules if there is a phenomenon which affects the geographical area for which the real property is located. For example, if there is a hazardous materials accident located where the projected damage zone is within the vicinity of a subscriber's real property, the subscriber will be sent an alert (notification) pushed to their electronic device (e.g., smart phone, tablet, PC, and the like) by conventional messaging means including, but not limited to, SMS, MMS, IM, Email, Phone, VOIP, and the like. Phenomena requiring an alert include, but are not limited to, hazardous materials outbreaks (e.g., weapons, ammunition, explosives, chemical, biological agents, nuclear materials, and the like), natural disasters (e.g., hurricanes, tornados, tsunamis, ice storm, severe wind, severe rain, severe snow, earthquakes, severe power outages, and the like), and civic authority restricted zones (e.g., hostage situation, required perimeter for containment, and the like).

In at least one embodiment, and similar to the embodiment mentioned previously, the secure portal provides for an alert to all subscriber modules within a geographical area for situations requiring briefs from civic authorities or government officials, for example "fugitive at large" spotted on foot within 2 kilometer radius of the subscriber module's real property.

In at least one embodiment, and similar to the embodiment mentioned previously, the secure portal provides for an alert to all subscriber modules within a specific industry sector. For example, a specific criminal activity is targeting an industry sector such as medical clinics and hospitals. The secure portal can retrieve the relevant parties, who are within the cited industry sector, based on information of the subscriber modules stored in the database. Law enforcement officials may utilize the secure portal to broadcast details of the criminal activity and how the criminal activity is circumventing current security practices and what steps to take. Additional information may be sent through the secure portal via an alert; such as, an attached picture or a sketch of any suspects.

In at least one embodiment, the civic authorities (e.g., police, fire, home land security, governmental health organizations, and the like) utilize the secure portal to broadcast alert based on the criteria specified above.

Secure Lockbox Implementation

In at least one embodiment, the secure portal allows for integration with secure lockboxes put physically on site in front of a subscriber module's real property.

For example, the subscriber module is a 50 story apartment building owner. The owner has a secure lock-box installed at the ground floor made for emergency access. In addition to conventional opening means, including a key, there is an option to input a code. The code may be an alphanumeric combination known by the owner. In this embodiment, if the owner provides for the lock-box combination to be known to the one or more emergency response parties, the information may be transferred in a variety of fashions. In at least one embodiment, the code is stored on the server which is retrieved by the one or more emergency response parties upon emergency (with a notification being sent to the property owner). In at least one embodiment, the code is generated and sent to the emergency response party upon a requisition by the emergency response party through the secure portal at the time of an emergency. In this way, the code is not stored for a sustained period of time and is generated only when required. With this information, the emergency response party can enter the subscriber's premises and deal with the emergency with ease without resorting to forceful entry methodologies.

The subscriber module can configure the specifics of sharing this lock-box code using the subscriber module's real property lockbox permission setting. In at least one embodiment, this setting is accessed via the dashboard interface.

Anytime the lock-box is utilized by the one or more emergency response parties, the subscriber module is notified immediately via SMS, MMS, IM, Email, Phone, VOIP, and the like.

Personal Home Implementation

In at least one embodiment, the secure portal allows for integration for a property owner of a single home. A home owner may upload real property information in relation to the residents of the home. For example, the home owner may upload data including, but not limited to, medical conditions of residents, medications of residents, family physician contact details of residents, emergency contact details of residents, home structural plans, home energy provider information, and other information in relation to the home or residents of the home.

Temporary Access Regime

In at least one embodiment, the secure portal allows for the subscriber module to allow for a select third party access to the real property information for a limited duration with pre-selection access settings. The subscriber can choose on the secure portal via a dashboard a particular third party who may or may not have previously authenticated with the secure portal. The third party is sent a 6 digit security code which can be utilized to login to the secure portal remotely with or without an account. This access is for a limited duration, for example 6 hours or 12 hours.

In at least one embodiment, each third party is afforded a separate security code with separate duration parameters. In this way, multiple parties may be given temporary access with specified parameters.

In at least one embodiment, the subscriber module specifies a generic temporary access with a fixed duration and a single code for all parties.

The third parties given access may include, but are not limited to, fire department, police, emergency first responders, construction workers, plumbers, electricians, trades people, family members, friends, and people with a level of established trust to the subscriber module.

The security code may be sent to the third party by any communication means including, but not limited to, SMS, email, phone, direct message, and proxy messaging.

Access to the real property information may include any and all types of information. In some instances, access to live camera feeds may be shared with the third parties.

In at least one embodiment, the subscriber module may terminate the access to the one or more third parties unilaterally by configuring the access to the channel. This may be implemented with the dashboard interface on the secure portal.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for providing subscribers an electronic emergency response portal on a network, the method comprising:
receiving at a secure portal real property information associated with a property location from a subscriber module associated with a property owner;
storing at a secure portal the received real property information in a database;
creating a secure portal interface associated with the real property information provided by the subscriber module over a network, a secure portal interface provided to one or more emergency response parties to access the real property information, when an emergency occurs at the property location, wherein the one or more emergency response parties are given access to the interface if a permission setting to the interface is granted by the subscriber module;
providing the real property information for the property location from the database through the secure portal interface over the network to the one or more emergency response parties based on the permission setting for a time-limited period; and
providing a notification to the subscriber module that the real property information has been provided to the one or more emergency response parties;
wherein the secure portal is external to the property location and a secure code to access a lock box at the associated property location is provided to the one or more emergency response parties if a subscriber module's real property lock box permission setting allows for access to the one or more emergency response parties.

2. A method of claim 1, wherein the one or more emergency response parties comprise at least one of: fire-response, police, emergency medical services, security, commissioners, homeland security, government officials, civic authorities, landlords, and real property owners/managers/occupants.

3. A method of claim 1, wherein the database contains a status flag for each subscriber module, the status flag representing the last interval check of a prompt to provide updated real property information.

4. A method of claim 1, wherein control of the of real property information with respect to a defined sub-group of emergency response party personnel is given to a ERP controller, the ERP controller providing specific information of the real property information to the defined sub-group.

5. A method of claim 1, wherein the subscribers may allow for one or more third parties access to the real property information, the method further comprising:
generating a security code;
sending the security code to the one or more third parties requesting access to the real property information; and
receiving the request for real property information from the one or more third parties, the request including the verification of the security code.

6. A method of claim 1 wherein the notification is sent to the subscriber module when the secure code is provided and a subsequent notification is sent to the subscriber module to change the secure code.

7. A method of claim 1 wherein the secure code is generated when required by the one or more emergency response parties.

8. A method of claim 1 wherein the real property information further comprises providing access to the video feed for one or more cameras associated with the property location.

9. A method of claim 1 wherein the subscriber module receives an alert when an event which affects a geographical area for which the real property is located is identified by the one or more emergency response parties.

10. A method of claim 1 wherein real property information further comprises location information associated with the property location wherein the one or more emergency response parties can send an alert to all subscriber modules in a defined geographical area based upon associated respective location information.

11. A system for providing subscribers an electronic emergency response portal on a network, the system comprising:
   a server configured to receive real property information from a subscriber module associated with a property owner, the server external to a property location associated with the real property information wherein the server is further configured to create a secure portal for the subscriber module, the secure portal providing an interface to one or more emergency response parties;
   a database configured to store the real property information associated with a property location from the subscriber module;
   a processing engine configured:
   to grant access to the secure portal interface by one or more emergency response parties if access is allowable by a permission setting of the subscriber module to access the real property information when an emergency occurs at the property location;
   to provide the real property information for the property location from the database through the secure portal interface over the network to the one or more emergency response parties based on the permission setting from a time-limited period;
   to provide a notification to the subscriber module that the real property information has been provided to the one or more emergency response parties; and
   to provide secure code to access the subscriber module's associated real property lock box to the one or more emergency response parties if a subscriber module's real property lock box permission setting allows for access to the one or more emergency response parties;
   an interface to a communication means allowing for communication between the server, the database; the subscriber module, and the processing engine.

12. A system of claim 11, wherein the one or more emergency response parties comprise at least one of: fire-response, police, emergency medical services, security, commissioners, homeland security, government officials, civic authorities, landlords, and real property owners/managers/occupants.

13. A system of claim 11, wherein the server is further configured to send the notification to the subscriber module upon access of the real property information by the one or more emergency response parties, the notification identifying the particulars of the access.

14. A system of claim 11, wherein control of the real property information with respect to a defined sub-group of emergency response party personnel is given to an ERP controller, the ERP controller providing specific information of the real property information to the defined sub-group.

15. A system of claim 11, wherein the subscribers allow for one or more third parties access to the real property information further comprises:
   the processing engine configured to generate a security code; and
   the server configured to send the security code to the one or more third parties, and wherein the server is further configured to receive the request for real property information from the one or more third parties, the request including the verification of the security code.

16. A system of claim 11 wherein the notification is sent to the subscriber module when the secure code is provided and a subsequent notification is sent to the subscriber module to change the secure code.

17. A system of claim 11 wherein the secure code is generated when required by the one or more emergency response parties.

18. A system of claim 11 further comprising providing access a video feed of one or more cameras associated with the property location.

19. A system of claim 11 wherein the subscriber module receives an alert when an event which affects a geographical area for which the real property is located is identified by the one or more emergency response parties.

20. A system of claim 11 wherein real property information further comprises location information associated with the property location wherein the one or more emergency response parties can send an alert to all subscriber modules in a defined geographical area based upon associated respective location information.

* * * * *